UNITED STATES PATENT OFFICE 2,369,472

EMULSIFICATION OF SYNTHETIC WAXES

Donald W. Light, Old Greenwich, and Russell L. Morgan, Greenwich, Conn., assignors to American Cyanamid Company, New York, N. Y., a corporation of Maine No Drawing. Application December 14, 1939, Serial No. 309,188

1 Claim. (Cl. 252—311.5)

This invention relates to the emulsification of synthetic waxes particularly the synthetic waxes produced by reacting polyamines with fatty acids.

It has been found to be very difficult to obtain dispersions of many synthetic waxes which are suitable for floor polishes of the so-called self-polishing type, i. e. those which do not require any rubbing to produce the polish.

An object of this invention is to produce emulsions of synthetic waxes which are suitable for use as floor polishes, particularly floor polishes of the so-called self-polishing type. Another object of this invention is to produce emulsions which have a relatively uniform particle size. Still another object of this invention is to produce an emulsion of a synthetic wax, the particle size of the disperse phase being sufficiently small and the particle configuration being such that films of the emulsion will dry to a glossy finish.

These and other objects are attained by adding with constant agitation molten wax together with an emulsifying agent to water at about boiling point, the temperature of the wax and emulsifying agent being at about or slightly above the boiling point of water, subsequently passing the dispersion while being maintained at a temperature above the melting point of the wax through a homogenizer one or more times and finally cooling the dispersion very rapidly to a temperature below the melting point of the wax.

The following example is given by way of illustration and not in limitation.

Example

| | Parts by weight |
|---|---|
| Synthetic wax "A" | 12 |
| Morpholine | 1.5 |
| Oleic acid | 1.5 |
| Water | 85 |

The wax, the morpholine and the oleic acid are melted together and heated to slightly above 100° C. The hot molten mixture is added in a thin continuous stream and with violent agitation to water which is maintained at about 100° C., preferably boiling water, precautions being taken to prevent any local cooling. The dispersion of molten wax thus obtained is passed through a suitable homogenizer, preferably of the slit type, one or more times. The dispersion is maintained at a temperature above the melting point of the wax during the homogenizing process. After being homogenized a sufficient number of times, the dispersion is cooled very rapidly to a temperature below the melting point of the wax. This may be done conveniently by adding ordinary ice or dry ice directly to the emulsion or by passing the emulsion through a series of cooling coils. If ordinary ice be added to the emulsion, the amount of water originally used should be reduced so that the finished composition will correspond to the above formulation. An excellent emulsion is obtained, films of which will dry to a glossy finish if the process outlined is followed closely. It is very important that the temperature of the water and the wax or the dispersion thereof be maintained in accordance with the teachings of this disclosure in order that an emulsion be obtained which will produce films having a glossy finish without rubbing.

Synthetic wax "A" may be any of the waxes produced by reacting a polyamine with a higher fatty acid and desirably having a melting point below about 100° C. Examples of such waxes are those obtainable by reacting a fatty acid containing at least 16 carbon atoms with a polyamine, preferably a polyamine, containing at least three amino groups. A specific example of this type of wax is the reaction product of one mol of diethylene triamine and more than two mols of stearic acid. The particular synthetic wax "A" used in the above example may be produced by reacting 103 parts of diethylene triamine with 852 parts of stearic acid, preferably in the presence of about 240 parts of a solvent such as toluene. The reaction is conveniently carried out in a suitable reaction chamber provided with an agitator and a reflux condenser. The reflux condenser is equipped with a trap in which the water formed during the reaction is separated from the essentially non-aqueous fraction of the condensate, the non-aqueous fraction being returned to the reaction chamber. The reaction is carried out at a temperature beginning at about 120° C. which is gradually increased to about 145° C. at which point it is maintained until the acid number of the reaction mixture becomes constant, e. g., about 48 hours. The product is cast into molds or it may be purified by recrystallization from hot alcohol. The melting point of the wax is about 85-90° C. and it is light-colored, particularly if recrystallized, is quite hard and has an acid number of about 25-30.

It has also been found to be desirable to replace part of the synthetic wax which is crystalline with one of the so-called amorphous waxes. This tends to inhibit the crystal growth of the crystalline synthetic wax and to produce emulsions which will dry to glossy finish when applied as films. Any wax or oil which exhibits a tendency to inhibit crystal growth may be employed in place of the amorphous wax.

Obviously pressures above atmospheric may be used in carrying out the emulsification process, such pressures being necessary if a wax be used with a melting point above about 100° C.

The process described above may be employed in producing emulsions of various mixtures of natural and synthetic waxes and with or without natural and synthetic resins in addition. It has been found to be particularly advantageous in some instances to prepare an emulsion of a mixture containing carnauba wax and a synthetic wax such as those described above. Especially useful emulsions may be prepared from mixtures of synthetic waxes and a natural or synthetic resin, e. g. shellac ester gum, alkyd resins, water-soluble natural resins such as gum arabic, etc.

Other emulsifying agents may be substituted for part or all of the morpholine oleate which is formed in the above example, e. g. fatty acid soaps of sodium, potassium, borax, ammonia, triethanolamine or other alkalies. Various other emulsifying agents may be used such as the sodium or other soluble salts of: sulfonated oils, the sulfonated and sulfated hydrocarbons, e. g. lauryl sulfate, the alkyl esters of sulfosuccinic acid, e. g. the dioctyl ester of sulfosuccinic acid, etc. Various amino emulsifiers may also be used such as the quaternary ammonium compounds, etc. Any of these compounds which may be formed by simply mixing two or more substances may be produced by adding such substances to the water or wax separately as indicated in the example or the compounds themselves may be used. These substances or other wetting agents may be added to the emulsions to provide proper spreading properties. Various other surface tension active agents may also be used such as alcohol, acetone, amines, etc. Furthermore, levelling agents may also be included in the compositions.

Generally only a small proportion of the emulsifier is sufficient but larger proportions may be used if desirable. We have found that between about 15% and 50% of the emulsifying agent based upon the proportion of wax is usually sufficient.

Our invention is particularly suited for the production of the so-called self-polishing floor wax emulsions. For this purpose it has been found preferable to employ compositions containing about 10% to 15% of solids.

Emulsions may be made according to our process for various other purposes such as for use in the cosmetic industry, in the lubricating industry, in the treatment of textiles, in the treatment of paper, etc.

Obviously many modifications and variations in the processes and products described herein may be made without departing from the spirit and scope of the invention as defined in the appended claim.

We claim:

A process for producing an aqueous wax emulsion of a synthetic wax which is the reaction product of one mol of diethylene triamine and more than two mols of stearic acid, in which said wax in molten form together with a water-soluble emulsifying agent is added to water which is at a temperature above the melting point of the wax, the temperature of the wax and emulsifying agent being slightly higher than the temperature of the water, the water being constantly agitated during the addition of wax and emulsifying agent, subsequently homogenizing the dispersion of wax and water at least once, the temperature of the dispersion being maintained above the melting point of the wax, and finally cooling the dispersion very rapidly to a temperature below the melting point of the wax.

DONALD W. LIGHT.
RUSSELL L. MORGAN.